United States Patent [19]

Zacher

[11] 4,426,212
[45] Jan. 17, 1984

[54] BRACING ASSEMBLY FOR CYCLONE DIPLEGS IN FLUIDIZED BED UNITS

[75] Inventor: Harold D. Zacher, Hammond, Ind.

[73] Assignee: Standard Oil Company (Indiana), Chicago, Ill.

[21] Appl. No.: 411,545

[22] Filed: Aug. 25, 1982

[51] Int. Cl.$^3$ .............................................. B01D 45/12
[52] U.S. Cl. .................................. 55/345; 55/459 R; 422/147; 422/310; 248/188.1
[58] Field of Search .................. 55/459 R, 342, 343, 55/344, 345; 422/147, 310; 208/161, 164; 252/417; 248/188.1

[56] References Cited

U.S. PATENT DOCUMENTS

| | | | |
|---|---|---|---|
| 2,904,410 | 9/1959 | Traue | 55/343 |
| 3,460,785 | 8/1969 | Abidi | 422/310 |
| 4,088,568 | 5/1978 | Schwartz | 252/417 |
| 4,273,565 | 6/1981 | Worley | 55/343 |
| 4,364,905 | 12/1982 | Fahrig et al. | 55/343 |

*Primary Examiner*—Bernard Nozick
*Attorney, Agent, or Firm*—Lansing M. Hinrichs; William T. McClain; William H. Magidson

[57] ABSTRACT

A bracing assembly for use in fluidized bed units having a number of cyclone separators equipped with diplegs is disclosed. The assembly comprises paired brace elements interconnecting adjacent diplegs to form a closed polygon whereby each dipleg in the polygon supports the others to eliminate sway or movement of the diplegs. The method of attachment of the brace elements is such as to accommodate large temperature differentials within the unit during operation and also between operation and shutdown without the creation of abnormal stresses. The assembly is particularly useful in the regenerator vessels of fluid catalytic cracking units.

5 Claims, 4 Drawing Figures

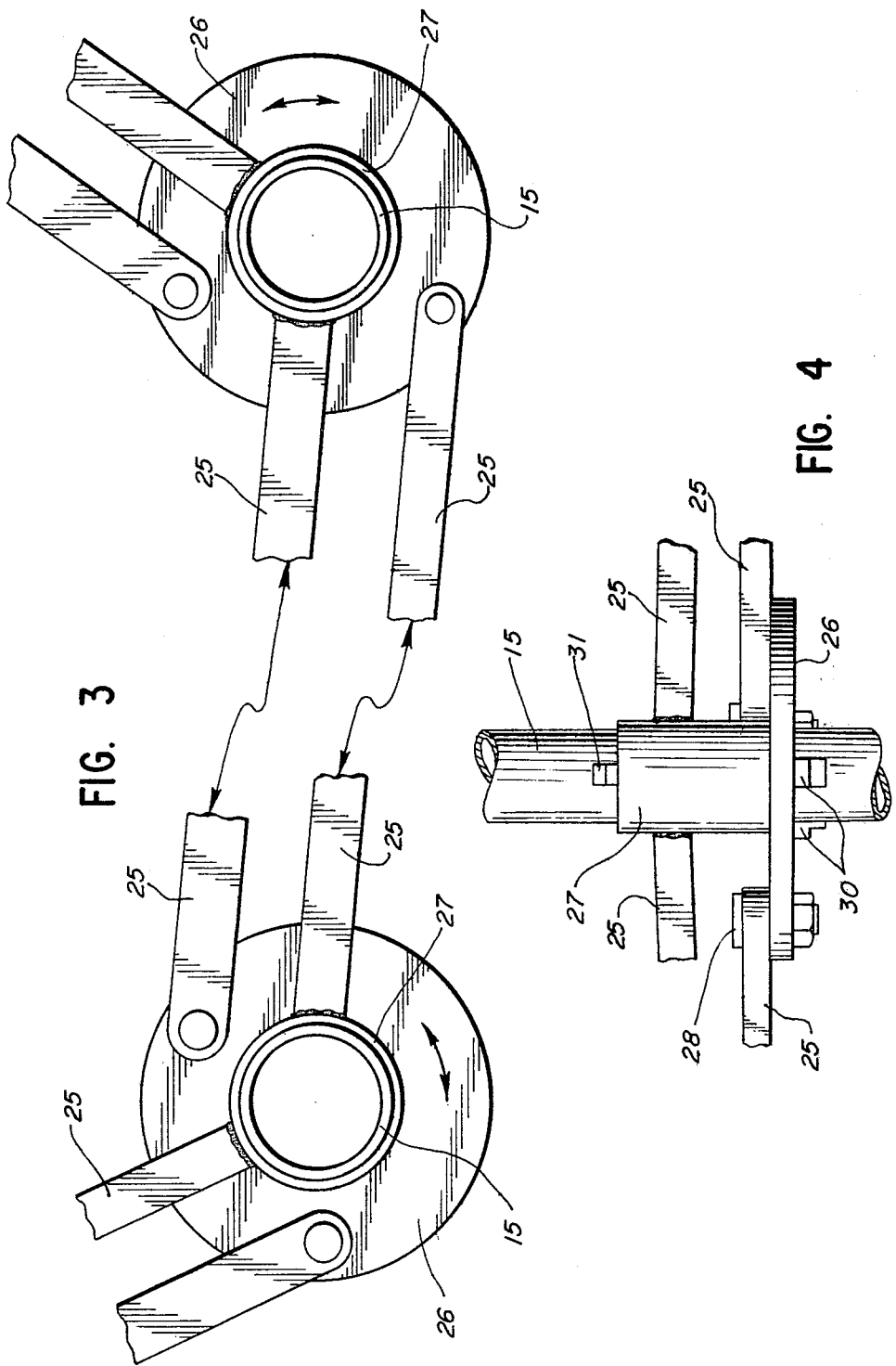

BRACING ASSEMBLY FOR CYCLONE DIPLEGS IN FLUIDIZED BED UNITS

FIELD OF THE INVENTION

Fluidized bed units have been widely used in the petroleum and chemical industries and more recently have been proposed for use in the production of synthetic fuels. In such units a bed of particulate catalyst or other particulate material is maintained in a fluidized state by an upwardly flowing vapor stream within an enclosing vessel. The vapor stream usually exits from the enclosing vessel through a plurality of cyclone separators the purpose of which is to separate the particulate from the vapor stream and each separator is equipped with downwardly extending pipe or dipleg for conveying the particulate to the bottom of the vessel. This invention relates to a novel bracing assembly for the cyclone diplegs.

BACKGROUND OF THE INVENTION

The bracing assembly of this invention is believed to have primary utility in regeneration vessels of fluid catalytic cracking units because the physical conditions present within such units are extremely severe. Operating temperatures may be as high as around 1450° F. in some regions in the unit and as low as about 1150° F. in other portions while the vessel shell temperature is only 300°–350° F. Moreover, in the case of an upset in operations rapid temperature changes can occur within the unit. Also the cyclone diplegs are subjected to the mechanical forces of particulate catalyst bed motion created by bursting bubbles of combustion gases which can result from normal or damaged air rings or spargers. Regeneration vessels are usually constructed to be quite tall in order to accommodate the catalyst dense bed and an adequate dilute phase (disengaging) zone above the bed. Since the cyclones are supported at the top of the vessel and the diplegs extend into the dense bed it is necessary that the diplegs be quite long relative to their diameters. Thus, it is desirable to provide bracing to prevent motion of the lower ends of the diplegs but heretofore this has been difficult to accomplish in some designs because intolerable thermal stresses can develop due to temperature changes and differentials which inevitably occur.

U.S. Pat. No. 4,273,565 to Worley discloses a cyclone support system suitable for use in a fluid coke burner. In this unit a number of cyclones are rigidly attached to the top of the vessel and the lower portions of adjacent diplegs are connected by horizontal bars apparently welded to the diplegs. The Worley arrangement, however, is not suitable for use in a fluid catalytic cracker regenerator unit, because wide temperature differentials can exist between the top of the vessel where the cyclones are attached and the region near the bottom of the vessel where lower ends of the diplegs are located. This temperature differential, if fixed braces are employed, will create high stresses leading to failure and requiring unit shutdown.

It is accordingly an object of this invention to provide a bracing assembly which will support a plurality of cyclone diplegs to minimize swaying and bending of the diplegs without the development of high thermal stresses.

It is a further object to provide an arrangement whereby each of a plurality of diplegs arranged in a polygonal pattern serves to provide bracing for the other diplegs.

SUMMARY OF THE INVENTION

The dipleg bracing assembly of this invention comprises a pair of brace elements for each of a plurality of diplegs arranged in a polygonal pattern, each of the brace elements being rigidly connected at one end to a sleeve element surrounding one of said diplegs in rotatable relationship therewith and being pivotally connected to an encircling ring element rotatably supported on an adjacent dipleg whereby each of the ring elements is pivotally connected to two brace elements extending from adjacent diplegs, the rigidly connected ends of the brace elements serving to maintain the angular relationship of the diplegs to each other and the rotatable ring elements which are pivotally connected to the brace elements permitting thermal expansion and contraction of the brace elements without imposing thermal stresses upon the diplegs.

Alternatively, the dipleg bracing assembly can be described as comprising in association with each of a plurality of cyclone diplegs which are disposed so as to be located at the corners of a regular polygon:

(a) a first and a second rotatably mounted element supported upon each dipleg near its lower end;

(b) a pair of brace elements rigidly connected to the first of said rotatably mounted elements, the rigidly connected elements being disposed at an angle to each other equivalent to 360° divided by the number of corners of the polygon; and (c) pivot means for connecting the nonrigidly connected ends of said brace elements to the second of the rotatably mounted elements on an adjacent dipleg, the two pivot means on each rotatably mounted element being disposed on opposite sides thereof permitting rotation of said element with thermal expansion or contraction of said brace elements.

BRIEF DESCRIPTION OF THE DRAWINGS

FIG. 3 is an enlarged top view illustrating the bracing assembly between two adjacent diplegs; and FIG. 4 is a side view showing a single dipleg and a preferred arrangement for attaching the ends of the bracing elements to the rotatable elements carried by the dipleg.

DETAILED DESCRIPTION OF THE INVENTION

Figure 1:
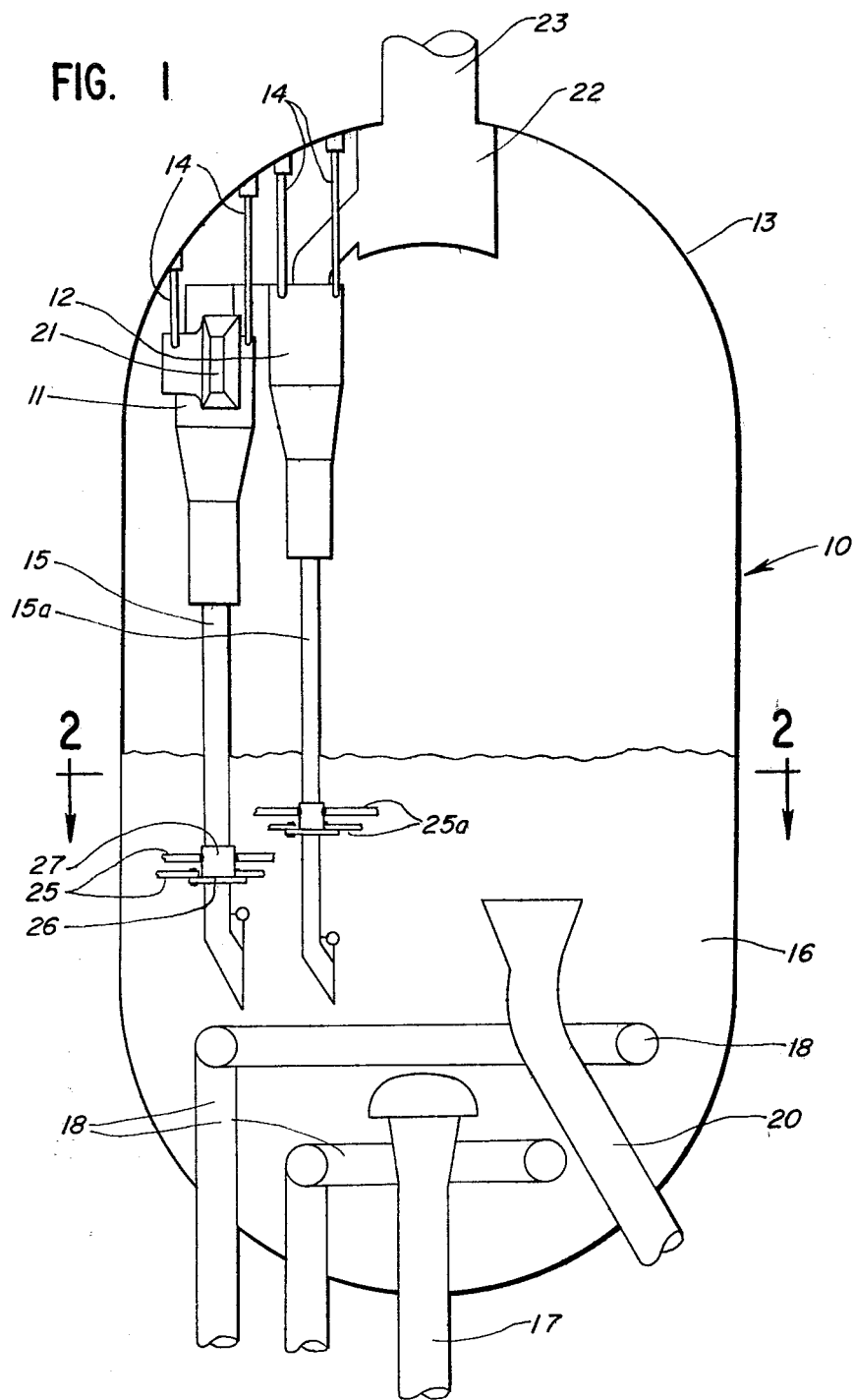
FIG. 1 is a sectional view showing the installation of the bracing assembly of this invention in the regeneration vessel of a fluid catalytic cracking unit.
Figure 2:
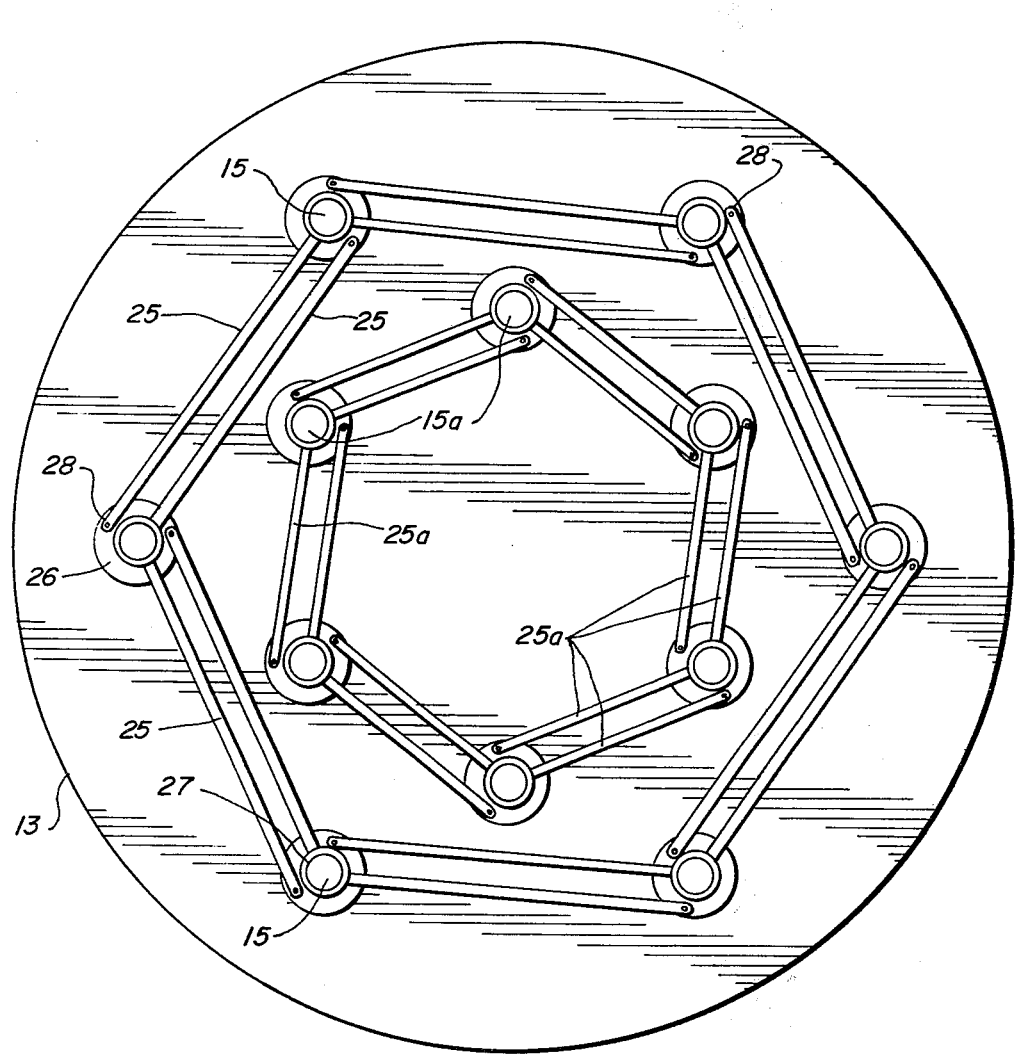
FIG. 2 is a section taken on line 2—2 of FIG. 1.

In FIGS. 1 and 2 a fluid catalytic cracking unit regenerator 10 having six primary cyclones 11 and six secondary cyclones 12 is depicted. These cyclones are rigidly suspended from the top of the regeneration vessel 13 by supporting bars 14 and have depending diplegs 15. The diplegs 15 extend to a level beneath the surface of the dense phase fluidized catalyst bed 16. Catalyst to be regenerated enters the regenerator at the bottom through conduit 17 and regeneration air enters through air rings 18. Regenerated catalyst exits through conduit 20 and is conducted back to the reactor (not shown). Regeneration gases exit the regenerator through inlet openings 21 in the primary cyclones 11, pass through both stages of cyclones 11 and 12 to plenum 22 and outlet 23. Catalyst particulates separated in the cyclones 11 and 12 drop into the dense phase bed 16 through the diplegs 15. It will be appreciated that the foregoing description is representative of conventional regeneration units and that it may be varied or modified from unit to unit in accordance with known practices. For example in the unit depicted in the drawings the primary cyclones are located near the vessel shell with the secondary cyclones toward the center. In many units these positions are reversed.

The dipleg bracing assembly is illustrated in FIG. 2 as it can be installed to support the diplegs 15 of six primary cyclones and the diplegs 15a of six secondary cyclones. The cyclones in the illustrated unit are arranged in hexagonal relationship but it should be understood that the arrangement can be in any desired regular polygon having sides of equal length and equal corner angles. Bracing is accomplished for each set of cyclones by pairs of brace elements 25 and 25a which extend to adjacent diplegs in the manner shown in FIG. 2 in a closed polygonal pattern. For simplicity the brace elements 25 have been illustrated as rectangular bars. In practice it is preferred to employ pipe sections, tee bars or angle iron bars in order to avoid sagging.

A preferred arrangement of attachment of the brace elements 25 to the diplegs 15 is illustrated in FIGS. 3 and 4. Each dipleg 15 has rotatably mounted thereon a ring element 26 and a sleeve element 27. The brace elements 25 are rigidly attached, preferably by welding at one end, to the sleeve elements 27 and extend to the ring elements 26 of the two adjacent diplegs 15 to which they are pivotally attached by bolts or pins 28. The ring and sleeve elements 26 and 27 are supported by clips 30 and hold down clips 31, each set of clips being welded to the diplegs.

The mode of operation of the bracing assembly under changing temperature conditions encountered in a regenerator unit can be described as follows: When the unit is not operating all parts will be at ambient temperature and not thermally stressed. During operation the upper shell of the vessel 13 will heat up somewhat, but being insulated will reach a temperature of around 300° to 350° F. and since the cyclones 11 and 12 are supported from the shell their relative spacing remains about the same. However, in the dense phase catalyst bed the temperature will be about 1200° to 1350° F. during operation of the unit and the bar elements 25 will be heated to the dense bed temperature and will have uniformly expanded to a length consistent with their elevated temperature but in so doing will have rotated the ring elements 26 in a counterclockwise direction as viewed in FIGS. 2 and 3. Thus, the rotation of the ring elements 26 accommodates for thermal expansion and prevents splaying of the diplegs 15 as would otherwise occur. However, since the expansion of the bracing elements 25 is uniform, the rotation of the ring elements 26 is also uniform and the distances between the diplegs remain unchanged and the composite bracing assembly provides a rigid structure able to resist any bending forces applied to the diplegs 15 due to gas bubbles or catalyst surges within the dense bed. The reason for the extreme rigidity of the thermally adaptable structural assembly is (1) that the angular relationship between the dipleg retaining elements (sleeves 27) is fixed because the pairs of bars 25 are rigidly attached thereto and (2) the distance between adjacent diplegs are constant due to rotation of the ring elements 26 accommodating for temperature changes.

Temperature excursions of the dense bed as may occur during operation of the unit or when it is shut down are similarly accommodated by expansion or contraction of the bars 25 and rotation of the ring elements 26. Unequal distribution of temperatures around the vessel cross section at the bracing elevation can occur but these are generally less than 100° F. so that stresses induced in the bracing are minimal. Further, pin connectors and hole clearances and dipleg flexibility assure that stresses are minimal.

It should be noted that the diplegs to be supported by the bracing assembly of this invention should be arranged or disposed in a pattern of a regular polygon so that the bracing elements 25 are all the same length. If the bracing elements are not equal in length expansion or contraction will be unequal, and appropriate rotation of the ring elements 26 under stress-free condition cannot occur. The situation can arise where, due to other requirements of the unit, such as the location of the regenerated catalyst conduit 20, one of the cyclones cannot be installed at a corner of the polygon. In such cases a "phantom" dipleg can be employed, i.e., an assembly of a ring element and sleeve element to which the bracing elements can be attached, can be supported at the appropriate corner of the polygon where the dipleg of the missing cyclone would otherwise be located.

For simplicity in the drawings and the above description only one bracing assembly for each set of diplegs has been shown. It will be appreciated by those familiar with the art that in many cases bracing assemblies at two or more elevations so as to also support intermediate portions of the diplegs are advantageous.

Also various changes and modifications such as will present themselves to those familiar with the art may be made without departing from the spirit of this invention. For example, the rotatably mounted elements 26 and 27 can be elements different in shape such as hubs with lever arm extensions instead of sleeves and rings, and the same functions can be obtained.

From the foregoing description it will be apparent to those familiar with the art that a bracing assembly for cyclone diplegs has been provided which can be adapted for use in a wide variety of process units utilizing fluidized beds of particulate materials as reactants, fuels, catalysts, heat transfer media and the like.

The scope of my invention is commensurate with the following claims.

I claim:

1. A dipleg bracing assembly comprising a pair of brace elements for each of a plurality of diplegs arranged in a regular polygonal pattern, each of the brace elements being rigidly connected at one end to a sleeve element surrounding one of said diplegs in rotatable relationship therewith and being pivotally connected to an encircling ring element rotatably supported on an adjacent dipleg whereby each of the ring elements is pivotally connected to two brace elements extending from adjacent diplegs, the rigidly connected ends of the brace elements serving to maintain the angular relationship of the diplegs to each other and the rotatable ring elements which are pivotally connected to the brace elements permitting thermal expansion and contraction of the brace elements without altering the distances between the diplegs or imposing thermal stresses upon the diplegs.

2. The bracing assembly of claim 1 wherein one or more of the diplegs is a "phantom" dipleg.

3. A bracing assembly for a plurality of diplegs arranged in a polygonal pattern, said assembly comprising a pair of brace elements for each dipleg rigidly connected at one end to a sleeve element surrounding one of said diplegs in rotatable relationship therewith and being pivotally connected to an encircling ring element rotatably supported on an adjacent dipleg whereby each of the ring elements is pivotally connected to two brace elements extending from adjacent diplegs, the rigidly connected ends of the brace elements serving to maintain the angular relationship of the diplegs to each other and the rotatable ring elements which are pivotally connected to the brace elements permitting thermal expansion and contraction of the brace elements without varying the spacing between adjacent diplegs.

4. A dipleg bracing assembly comprising in association with each of a plurality of cyclone diplegs which are disposed so as to be located at the corners of a regular polygon:
   (a) a first and a second rotatably mounted element supported upon each dipleg;
   (b) a pair of brace elements rigidly connected to the first of said rotatably mounted elements, the rigidly connected elements being disposed at an angle to each other equivalent to 360° divided by the number of corners of the polygon; and
   (c) pivot means for connecting the nonrigidly connected ends of said brace elements to the second of the rotatably mounted elements on an adjacent dipleg, the two pivot means on each rotatably mounted element being disposed on opposite sides thereof permitting rotation of said element with thermal expansion or contraction of said brace elements.

5. A dipleg bracing assembly comprising in association with each of a plurality of cyclone diplegs which are disposed so as to be located at the corners of a regular polygon:
   (a) a first and a second rotatably mounted element supported upon each dipleg at an elevation where bracing is required;
   (b) a pair of brace elements connected to the first of said rotatably mounted elements, said elements being disposed at an angle to each other whereby each extends in the direction of an adjacent corner of said polygon; and
   (c) pivot means for connecting the other ends of said brace elements to the second of the rotatably mounted elements on an adjacent dipleg, the two pivot means on each rotatably mounted element being disposed on opposite sides thereof permitting rotation of said element with thermal expansion or contraction of said brace elements.

* * * * *